US006854290B2

(12) United States Patent
Hayes et al.

(10) Patent No.: US 6,854,290 B2
(45) Date of Patent: Feb. 15, 2005

(54) METHOD FOR CONTROLLING FOAM PRODUCTION IN REDUCED PRESSURE FINING

(75) Inventors: James C. Hayes, Painted Post, NY (US); Rand A. Murnane, Big Flats, NY (US); Ronald W. Palmquist, Horseheads, NY (US); Frank Woolley, Ayer, MA (US)

(73) Assignee: Corning Incorporated, Corning, NY (US)

( * ) Notice: Subject to any disclaimer, the term of this patent is extended or adjusted under 35 U.S.C. 154(b) by 208 days.

(21) Appl. No.: 09/908,302

(22) Filed: Jul. 18, 2001

(65) Prior Publication Data

US 2003/0015000 A1 Jan. 23, 2003

(51) Int. Cl.⁷ .............................. C03B 5/187; C03B 5/20
(52) U.S. Cl. .................... 65/134.2; 65/134.9; 65/135.1; 65/135.3; 65/178
(58) Field of Search ..................... 65/178–180, 29.17, 65/34, 99.4, 125, 134.1, 134.2, 134.4, 134.6, 134.7, 134.8, 134.9, 135.1, 135.2, 135.3, 135.4, 135.6, 157, 20, 346–347; 96/155, 202, 203, 176–180; 226/207–212, 233–235; 75/10.64; 373/27, 33–35

(56) References Cited

U.S. PATENT DOCUMENTS

| | | | | |
|---|---|---|---|---|
| 1,598,308 A | * | 8/1926 | Pike ............................ 65/134.2 |
| 3,610,600 A | * | 10/1971 | Schnake ....................... 266/209 |
| 3,649,235 A | * | 3/1972 | Harris ........................... 65/490 |
| 3,976,473 A | * | 8/1976 | Katayama et al. ............. 75/512 |
| 4,704,153 A | | 11/1987 | Schwenninger et al. ...... 65/134 |
| 4,780,122 A | * | 10/1988 | Schwenninger et al. ... 65/134.2 |
| 4,794,860 A | * | 1/1989 | Welton ....................... 65/134.2 |
| 4,838,919 A | * | 6/1989 | Kunkle et al. ............... 65/17.3 |
| 4,849,004 A | | 7/1989 | Schwenninger et al. ...... 65/134 |
| 4,919,697 A | * | 4/1990 | Pecoraro et al. ........... 65/134.2 |
| 5,091,000 A | * | 2/1992 | Ishii et al. .................... 75/508 |
| 5,356,456 A | * | 10/1994 | Nishikawa et al. ........... 75/508 |
| 5,468,280 A | * | 11/1995 | Areaux ......................... 75/708 |
| 5,573,564 A | * | 11/1996 | Richards .................... 65/29.13 |
| 5,849,058 A | | 12/1998 | Takeshita et al. .......... 65/134.2 |
| RE36,082 E | * | 2/1999 | Ishimura et al. ............. 65/32.5 |
| 6,286,337 B1 | * | 9/2001 | Palmquist .................... 65/157 |
| 6,294,005 B1 | * | 9/2001 | Inoue et al. .................. 96/193 |
| 6,318,126 B1 | * | 11/2001 | Takei et al. ................ 65/134.2 |
| 6,332,339 B1 | * | 12/2001 | Kawaguchi et al. ....... 65/134.2 |
| 6,460,376 B1 | * | 10/2002 | Jeanvoine et al. ......... 65/134.2 |

FOREIGN PATENT DOCUMENTS

JP  2000-178028  *  6/2000  ........... C03B/5/225

OTHER PUBLICATIONS

U.S. Appl. Ser. No. 09/606,953, entitled "Tubing System for Reduced Pressure Fining" filed Jun. 29, 2000, by R. W. Palmquist.

* cited by examiner

*Primary Examiner*—Peter Chin
*Assistant Examiner*—Eric Hug
(74) *Attorney, Agent, or Firm*—Thomas R. Beall; Angela N. Nwaneri; William J. Tucker

(57) ABSTRACT

A method for controlling the foam produced when a molten material encounters reduced pressure in a vacuum chamber includes passing the molten material through an aging zone in the vacuum chamber in which the molten material is allowed to drain from between the bubbles of the foam and then collapsing the bubbles of the drained foam.

9 Claims, 10 Drawing Sheets

METHOD FOR CONTROLLING FOAM PRODUCTION IN REDUCED PRESSURE FINING

BACKGROUND OF THE INVENTION

1. Technical Field

The invention relates generally to reduced pressure fining, a process for removing trapped bubbles in molten material, e.g., molten glass. More specifically, the invention relates to a method for controlling the foam produced when the molten material encounters reduced pressure in a reduced pressure finer.

2. Background Art

In industrial glassmaking, a glass batch is made by mixing in blenders a variety of raw materials obtained from properly sized, cleaned, and treated materials that have been pre-analyzed for impurity. Recycled glass called cullet may also be mixed with the raw materials. For the most commonly produced soda-lime glass, these raw materials include silica ($SiO_2$), soda ($Na_2O$), lime (CaO), and various other chemical compounds. The soda serves as a flux to lower the temperature at which the silica melts, and the lime acts as a stabilizer for the silica. A typical soda-lime glass is composed of about seventy percent silica, fifteen percent soda, and nine percent lime, with much smaller amounts of the various other chemical compounds. The glass batch is conveyed to a "doghouse", which is a hopper at the back of the melting chamber of a glass melting furnace. The glass batch may be lightly moistened to discourage segregation of the ingredients by vibrations of the conveyor system or may be pressed into pellets or briquettes to improve contact between the particles.

The glass batch is inserted into the melting chamber by mechanized shovels, screw conveyors, or blanket feeders. The heat required to melt the glass batch may be generated using natural gas, oil, or electricity. However, electric melting is by far the most energy efficient and clean method because it introduces the heat where needed and eliminates the problem of batch materials being carried away with the flue gases. To ensure that the composition of the molten glass is homogenous throughout, the molten glass is typically stirred together in a conditioning chamber that is equipped with mechanical mixers or nitrogen or air bubblers. The molten glass is then carried in a set of narrow channels, called forehearth, to the forming machines. In the melting chamber, large quantities of gas can be generated by the decomposition of the raw materials in the batch. These gases, together with trapped air, form bubbles in the molten glass. Large bubbles rise to the surface, but, especially as the glass becomes more viscous, small bubbles are trapped in the molten glass in such numbers that they threaten the quality of the final product. For products requiring high quality glass, e.g., optical lenses, television panels, and liquid crystal displays, the trapped bubbles are removed from the molten glass prior to feeding the molten glass into the forming machines.

The process of removing bubbles from molten glass is called fining. One method for fining glass involves adding various materials known as fining agents to the glass batch prior to mixing in the blenders. The primary purpose of the fining agents is to release gas in the molten glass when the molten glass is at the proper fining temperature. The released gas then diffuses into gas bubbles in the molten glass. As the bubbles become larger, their relative buoyancy increases, causing them to rise to the surface of the molten glass where they are released. The speed at which the bubbles move through the molten glass may be increased by reducing the viscosity of the molten glass, and the viscosity of the molten glass can be reduced by increasing the temperature of the molten glass. An effective fining agent for atmospheric pressure, glass melting and fining processes should be able to release a large amount of fining gases as the temperature of the molten glass is increased to the temperature range where the viscosity of the molten glass is sufficiently low, i.e., 1300° C. to 1500° C. for soda-lime glass. Examples of fining agents that are suitable for use with soda-lime glass are arsenic oxide ($As_2O_3$) and antimony oxide ($Sb_2O_3$). These fining agents are, however, detrimental to the environment and require careful handling.

Another method for fining glass involves passing the molten glass through a low pressure zone to cause the bubbles in the molten glass to expand and rise quickly to the surface of the glass. This process is typically referred to as reduced pressure fining or vacuum fining. There are various configurations of reduced pressure finers. U.S. Pat. No. 5,849,058 to Takeshita et al. discloses the general structure of a siphon-type reduced pressure finer. The reduced pressure finer, as shown in FIG. 1, includes a vacuum vessel 1 disposed in vacuum housing 2. The vacuum vessel 1 has one end connected to an uprising pipe 3 and another end connected to a downfalling pipe 4. The uprising pipe 3 and the downfalling pipe 4 are made of platinum, a material that can withstand the high temperature of the molten glass and that is not easily corroded. The vacuum vessel 1, the uprising pipe 3, and the downfalling pipe 4 are heated by electricity. An insulating material 5 is provided around the vacuum vessel 1, the uprising pipe 3, and the downfalling pipe 4. Typically, the insulating material 5 consists generally of insulating bricks and doubles as a structural support for the uprising pipe 3 and the downfalling pipe 4. The bottom ends of the uprising pipe 3 and the downfalling pipe 4 that are not connected to the vacuum vessel 1 extend through the vacuum housing 2 into the storage vessels 6 and 7, respectively. The storage vessel 1 is connected to receive molten glass from a glass melting furnace (not shown).

Flow of molten glass through the uprising pipe 3, the vacuum vessel 1, and the downfalling pipe 4 follows the siphon principle. Accordingly, the liquid surface of the molten glass in the vacuum vessel 1 is higher than the liquid surface of the molten glass in the storage vessel 6, and the pressure in the vacuum vessel 1 is lower than the pressure in the storage vessel 6. The pressure in the vacuum vessel 1 is related to the elevation of the liquid surface of the molten glass in the vacuum vessel 1 with respect to the liquid surface of the molten glass in the storage vessel 6. The height of the liquid surface of the molten glass in vacuum vessel 1 with respect to the liquid surface of the molten glass in the storage vessel 6 is set based on the desired fining pressure and the rate at which molten glass is flowing into the vacuum vessel 1. The molten glass with the trapped bubbles is transferred from the glass melting furnace (not shown) into the storage vessel 6. Because the pressure in the vacuum vessel 1 is less than the pressure in the storage vessel 6, the molten glass in the storage vessel 6 rises through the uprising pipe 3 into the vacuum vessel 1. The pressure in the vacuum vessel 1 is brought to reduced pressure condition of less than the atmospheric pressure, typically $\frac{1}{20}$ to $\frac{1}{3}$ atmospheric pressure. As the molten glass passes through the vacuum vessel 1 and encounters the reduced pressure, the bubbles in the molten glass expand and quickly rise to the surface of the molten glass. The refined glass descends into the storage vessel 7 through the downfalling pipe 4.

Foam is produced in the headspace 8 as the molten glass encounters the reduced pressure in the vacuum vessel 1. The headspace 8 must either be large enough to contain the foam, or the foam must be controlled, to prevent equipment flooding and other process upsets and quality problems. In large scale processes, it is usually not practical to make the headspace 8 big enough to contain the foam, especially because the headspace 8 must be maintained airtight. U.S. Pat. No. 4,704,153 issued to Schwenninger et al. discloses a method for controlling foam that includes providing a burner in the headspace. Schwenninger et al. in the '153 patent disclose that the heat from the burner reduces the viscosity of the foam and increases the volume of the bubbles of the foam, causing the bubbles to burst. U.S. Pat. No. 4,794,860 issued to Welton discloses a foam control method that includes applying agents to the foam, which cause coalescence of the bubbles and/or interrupt the surface tension in the bubble membranes so that the bubbles burst. Examples of foam breaking agents include water, alkali metal compounds such as sodium hydroxide or sodium carbonate, alcohol, and fuel oil. U.S. Pat. No. 4,849,004 issued to Schwenninger et al. discloses a foam control method that includes suddenly changing the pressure in the headspace so as to disrupt the bubble membranes of the foam, thereby bursting a substantial portion of the bubbles and expediting collapse of the foam. A sudden surge of low pressure is used to expand the foam bubbles beyond their limit of elasticity, at which point they break. The pressure surges may be applied at intervals of several minutes, and the duration of the pressure surges may be on the order of a few seconds.

SUMMARY OF THE INVENTION

One aspect of the invention is a method for controlling the foam produced when a molten material encounters reduced pressure in a vacuum chamber. The method includes passing the molten material through an aging zone in the vacuum chamber, wherein the molten material is allowed to drain from between the bubbles of the foam, and breaking the bubbles of the drained foam. In another aspect, the method includes allowing the foam to flow from the vacuum chamber into a foam chamber separate from the vacuum chamber. In yet another aspect, the method includes allowing the molten material to flow into the vacuum chamber through an inclined conduit, wherein the bubbles in the molten material collect on a surface of the inclined conduit as the molten material flows through the inclined conduit.

DETAILED DESCRIPTION

Figure 1:
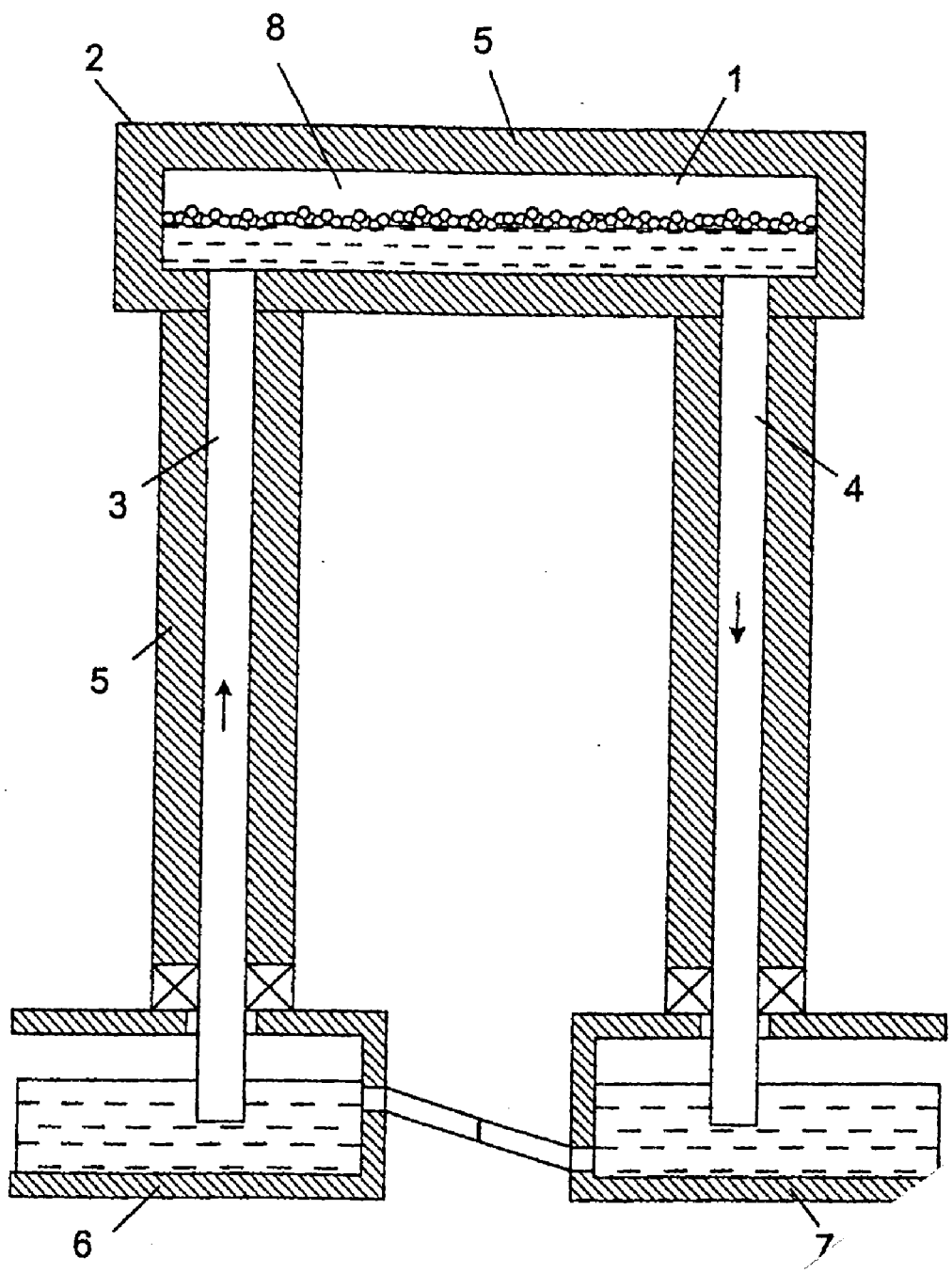
FIG. 1 shows the general structure of a siphon-type reduced pressure finer.
Figure 2:
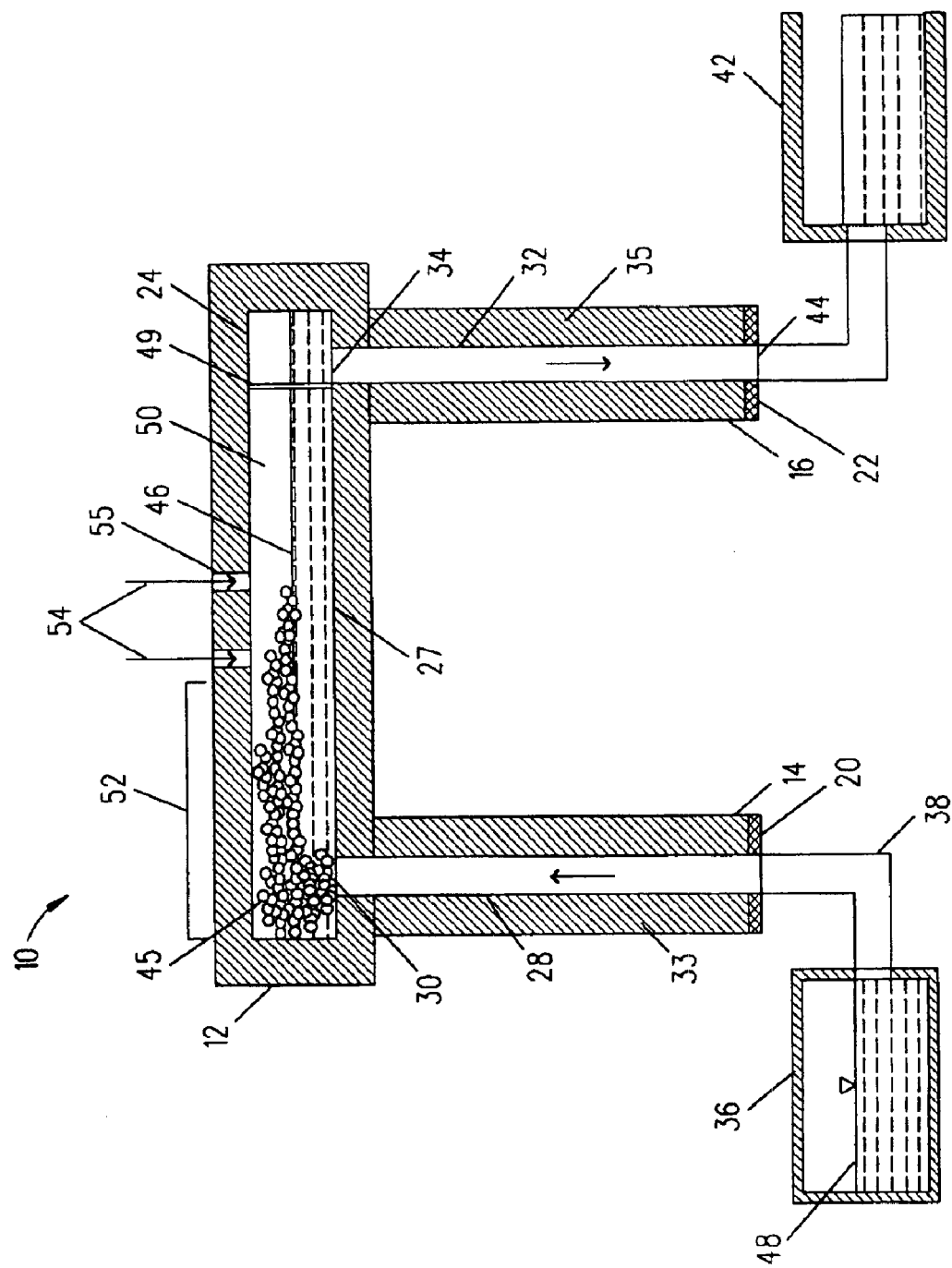
FIG. 2 is a schematic illustration of a reduced pressure finer.

FIG. 2 is a schematic illustration of a siphon-type reduced pressure finer 10 suitable for removing bubbles trapped in molten glass or other molten material. There are other types of reduced pressure finer configurations that may be suitable for use with the invention, see, for example, U.S. Pat. No. 4,780,122 issued to Schwenninger et al. which discloses a non-siphon-type reduced pressure finer. The reduced pressure finer 10 includes a vacuum housing 12 which has an inlet end 14 and an outlet end 16. The vacuum housing 12 is maintained in a substantially airtight condition by providing seals 20, 22 at the inlet end 14 and the outlet end 16, respectively. A finer chamber 24 is mounted inside the vacuum housing 12. The finer chamber 24 is encased in refractory insulation 25. The finer chamber 24 is usually heated by means of electricity, and, at least, the bottom portion 27 of the finer chamber 24 that comes in contact with the molten glass is lined with or made of a material that has a high melting point and that is corrosion resistant, e.g., platinum or platinum alloy.

A riser tube 28 rises from the inlet end 14 of the vacuum housing 12 to an inlet port 30 in the finer chamber 24, and a descender tube 32 descends from an outlet port 34 in the finer chamber 24 to the outlet end 16 of the vacuum housing 12. Typically, the tubes 28, 32 are made of a material such as platinum or platinum alloy. Like the finer chamber 24, the tubes 28, 32 are also heated. Refractory insulation 33, 35 are provided around the tubes 28, 32 to minimize heat loss from the tubes 28, 32 and provide structural support to the tubes 28, 32. The material used to construct the tubes 28, 32 expands, but at a different rate than the refractory insulation 33, 35 around the tubes 28, 32. Thus, maintaining a reliable seal at the inlet end 14 and the outlet end 16, where the tubes 28, 32 exit the vacuum housing 12, is difficult. U.S. application Ser. No. 09/606,953, entitled "Tubing System for Reduced Pressure Fining," filed Jun. 29, 2000 by R. W. Palmquist, discloses a suitable method for sealing the inlet and outlet ends of the vacuum housing while accommodating expansion of the tubes and the refractory insulation around the tubes.

In a typical glass fining process, the tubes 28, 32 and the finer chamber 24 are heated to a selected temperature, e.g., 1400° C. Molten glass from a glass melting furnace 36 then flows into the riser tube 28 through a conduit 38. A valve (not shown) may be provided to control the rate at which molten glass is transferred into the riser tube 28, thus making it possible to control the pressure in the finer chamber 24. A stir chamber or storage vessel 42 that is connected to the outlet end 16 of the vacuum housing 12 is also preheated to a selected temperature, e.g., 1400° C., and recycled glass, also known as cullet, is fed into the stir chamber 42 and allowed to melt until the level of glass in the stir chamber 42 reaches the outlet end 44 of the descender tube 32. Once the outlet end 44 of the descender tube 32 is immersed in molten glass, the pressure in the finer chamber 24 is slowly reduced so that molten glass is drawn into the finer chamber 24 through the tubes 28, 32. The pressure in the finer chamber 24 may be reduced by using a vacuum pump (not shown) to draw air out of the finer chamber 24. While glass is drawn into the finer chamber 24, more cullet may be melted in the stir chamber 42 to ensure that the outlet end 44 of the descender tube 32 remains immersed in molten glass. Once the molten glass in the finer chamber 24 reaches the desired level, flow through the reduced pressure finer 10 is started by drawing glass out of the stir chamber 42.

During operation, molten glass flows through the reduced pressure finer 10 like a siphon. The pressure in the finer chamber 24 is reduced below atmospheric pressure to encourage expansion of the bubbles trapped in the molten glass. To achieve a desired sub-atmospheric pressure in the finer chamber 24, the surface 46 of the glass in the finer chamber 24 is elevated a predetermined height above the surface 48 of the glass in the glass melting furnace 36. When the molten glass enters the finer chamber 24 and encounters the reduced sub-atmospheric pressure in the finer chamber 24, the trapped bubbles in the molten glass rapidly expand and move to the surface 46 of the glass. It is important to select an appropriate length for the finer chamber 24 that will allow adequate residence time for the trapped bubbles in the glass to rise to the glass surface 46 and break. It is also important that a headspace 50 above the glass surface 46 is provided to accommodate the layer of foam 45 generated as a result of the rapidly expanding bubbles moving to the glass surface 46. The foam 45 created during the fining process is persistent and can quickly occupy all available space if not controlled. A baffle plate 49 is positioned near the outlet port 34 of the finer chamber 24 to keep foam out of the descender tube 32.

Figure 3:
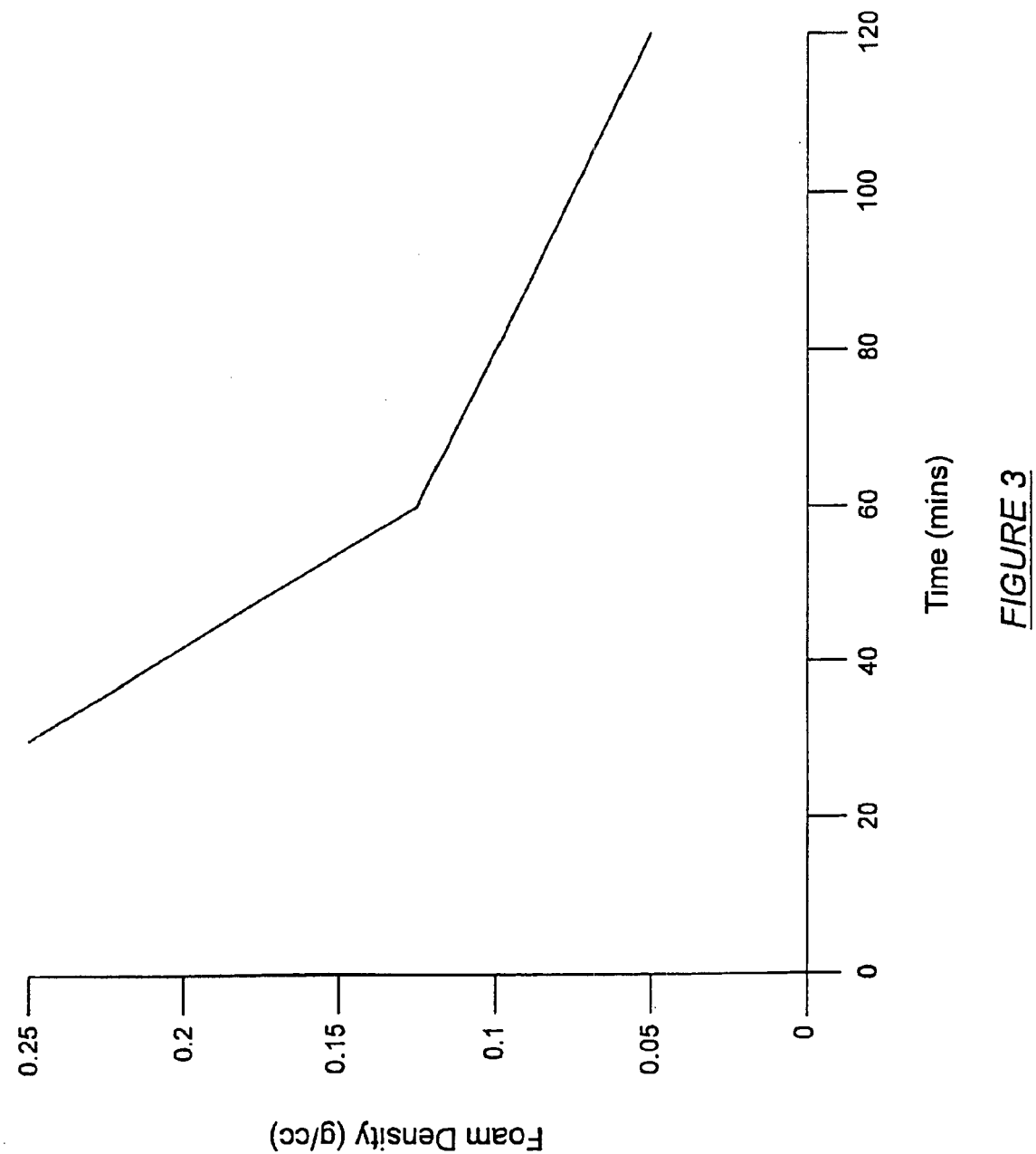
FIG. 3 illustrates how foam density changes with time.
Figure 4:
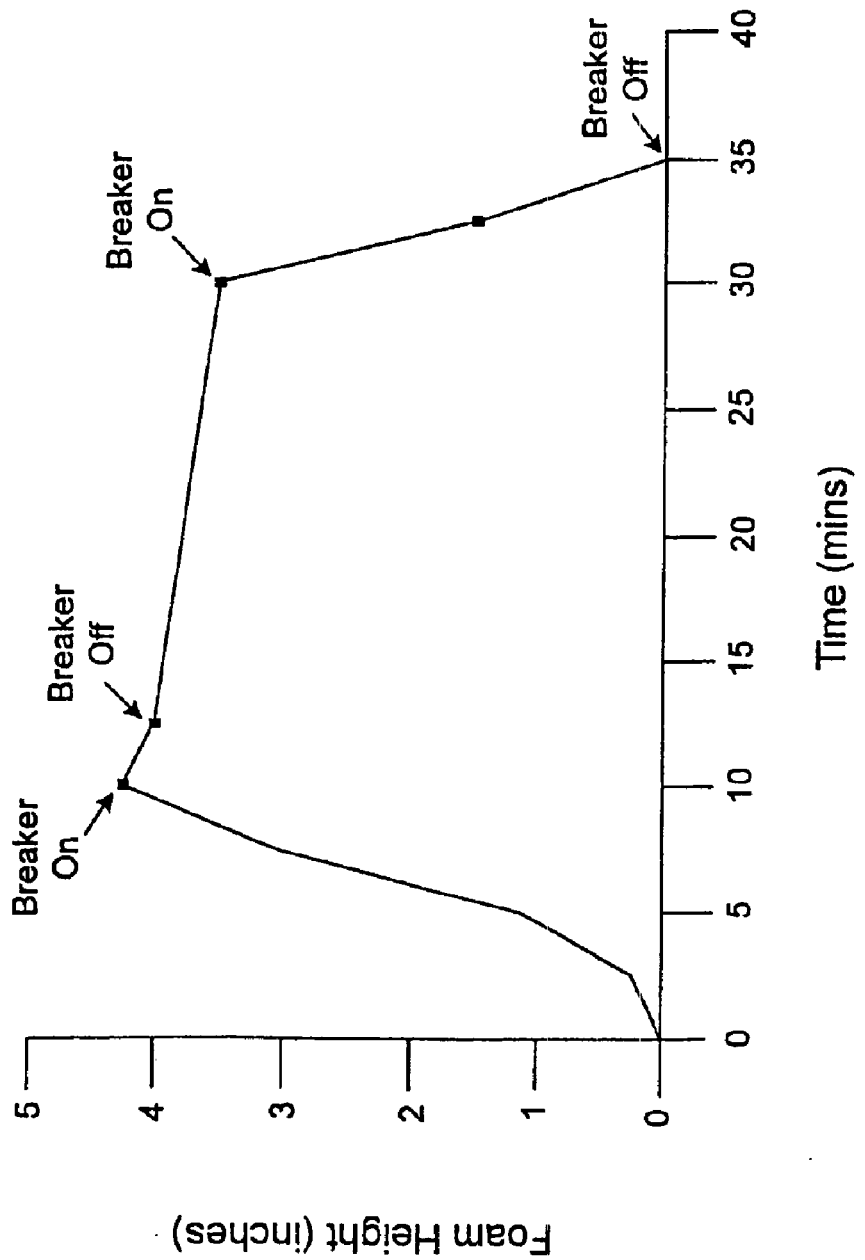
FIG. 4 illustrates how fragility of the foam increases with time.

The foam 45 that is newly created as the molten glass G encounters the reduced pressure in the finer chamber 24 is resilient and dense. This newly created foam 45 may contain as much as 50% glass. However, as shown in FIGS. 3 and 4, the resiliency and density of the foam 45 decreases with time as the foam 45 moves along the finer chamber 24 and the glass drains from the foam back into the molten glass G beneath it. Old foam 45 may contain as little as 5–10% glass. As the foam 45 becomes more fragile, it becomes easier to break the foam. For example, as demonstrated in FIG. 4, when the foam 45 is allowed to age for 10 minutes, foam breakers can be applied to the foam 45 for a duration of about 2.5 minutes to obtain a reduction in foam height of about 0.25 inches. However, when the foam 45 is allowed to age for 30 minutes, foam breakers can be applied to the foam 45 for the same duration to obtain a reduction in foam height of about 2 inches, a seven-fold reduction in foam height for the same 2.5-minute foam breaking action. The invention includes providing a foam aging zone 52 in the finer chamber 24 that allows the foam 45 to "age" or drain for a critical time before breaking the foam. Foam breakers 54 are then applied at the end of the foam aging zone 52 to break the foam 45. The foam breakers 54 are inserted through ports 55 in the finer chamber 24.

Figure 5A:
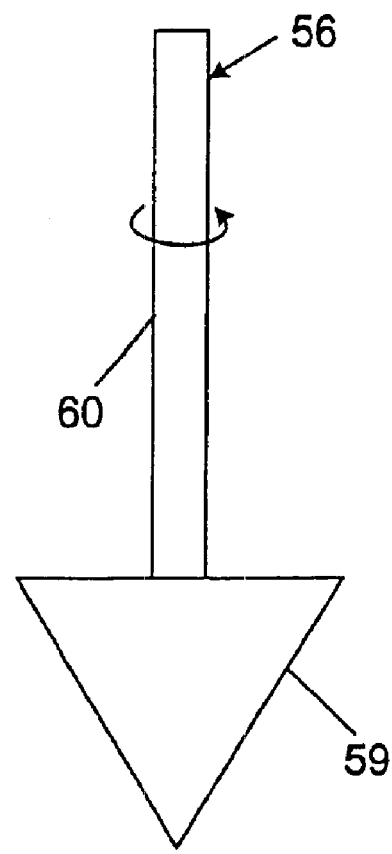
FIG. 5A is a schematic illustration of a rotating cone.
Figure 5B:
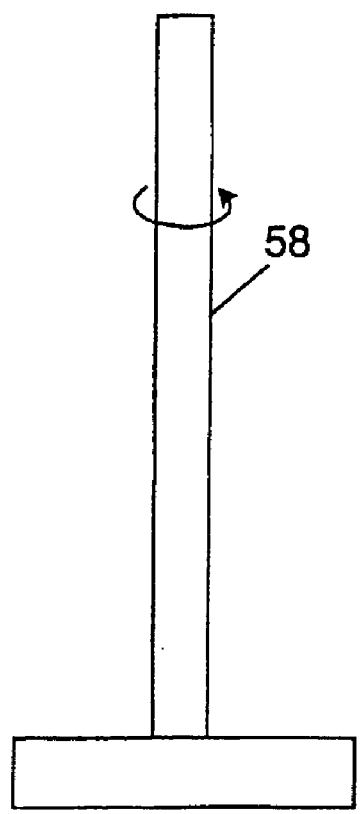
FIG. 5B is a schematic illustration of a rotating bar.

In one embodiment, the foam breakers 54 are mechanical rotators, e.g., the rotating cone 56 (shown in FIG. 5A) and the rotating bar 58 (shown in FIG. 5B). These rotators stretch and rupture the foams. The rotating cone 56 (shown in FIG. 5A) includes an inverted cone 59 that is mounted at the end of a rod 60. The angle α of the cone is steep, e.g., 70°, to minimize outward flinging of the glass, which would create bubbles anew when it hits the side walls of the finer chamber 24 and recombines with the molten glass G. Because the influence of a rotator is confined mainly to an area of the same diameter as the rotator, multiple or moving rotators are needed to treat larger or non-circular areas of foam. The number and placement of the rotators are determined by the fining and foaming behavior of the glass and the amount of shearing required to break the foam. Of course, based on the fining and foaming behavior of the glass, the length of the aging zone 52 should be selected such that when the rotators are applied to the foam 45 at the end of the aging zone 52, the desired rapid breaking of the foam 45 is achieved.

Figure 6:
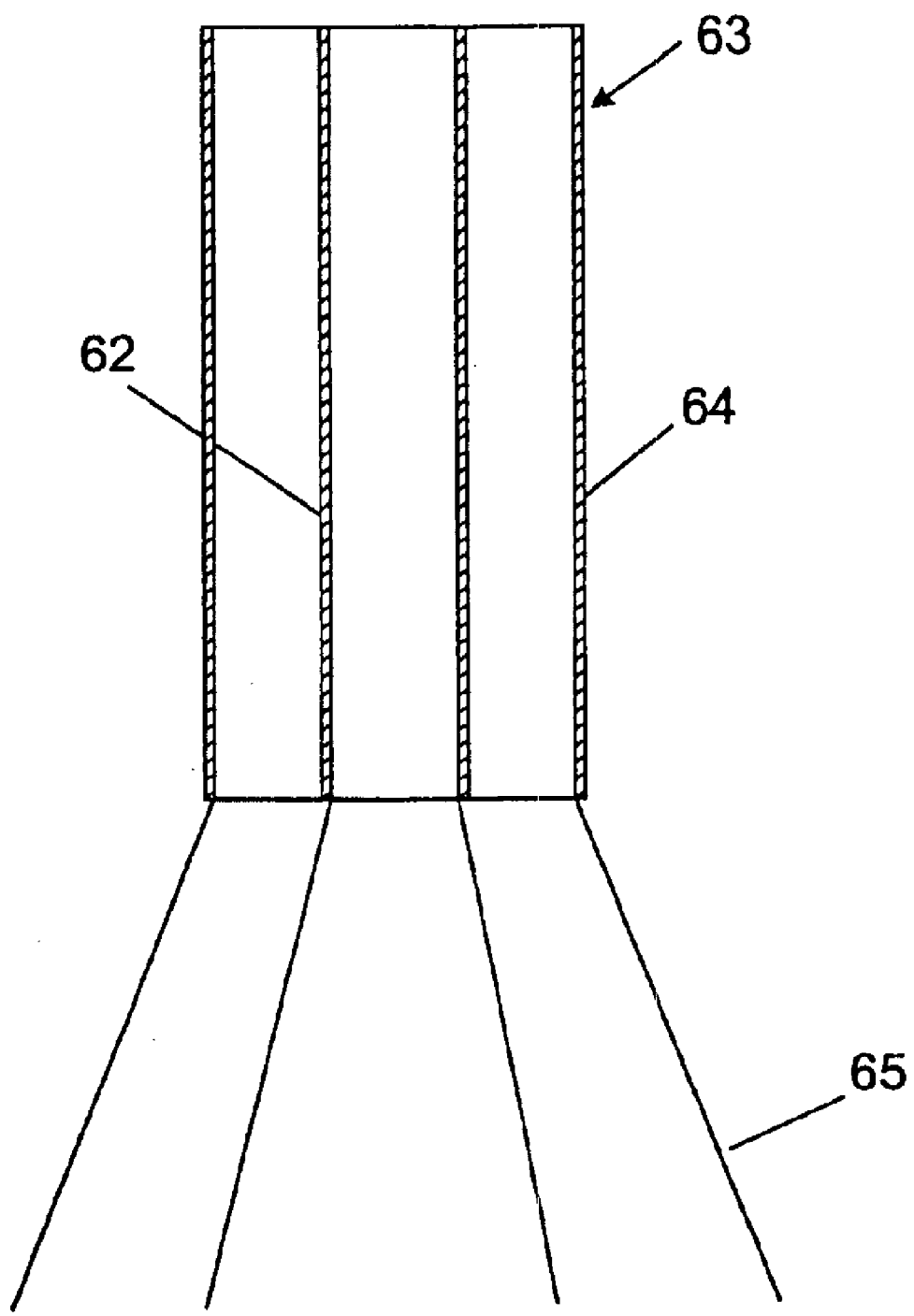
FIG. 6 shows a gas jet impinging on a glass/foam surface.

The foam breakers 54 could also be nozzles which produce gas jets. FIG. 6 shows an example of a nozzle 63 that includes two concentric tubes 62, 64. The inner tube 62 is connected to a gas source (not shown), and the outer tube 64 is connected to an another gas source (not shown). The gases exit the nozzle 62, 64 in form of a jet 65, which then impinges on the foam 45. The impact force of the gas jet 65 as it impinges on the foam 45 breaks the foam 45. In one embodiment, the gas flowing through the inner tube 62 is hydrogen, and the gas flowing through the outer tube 64 is oxygen. The flow rates of the hydrogen and oxygen gases are appropriately selected so that the ratio of hydrogen to oxygen is outside of a range in which stable flames are formed. Under optimum conditions, the jet 65 mechanically breaks the foam 45 without lowering the foam temperature or heating the foam. Heating the foam 45 would cause thermal reboil of the foam and create new bubbles and foam. It should be clear, however, that the nozzle 63 shown in FIG. 6 is just one example of a nozzle that may be used to produce a gas jet. Other suitable nozzle configurations may be selected based on the desired depth and area of penetration of the jet 65. Also, the gas (or gases) used in producing the gas jet 65 does not have to be combustible. Preferably, the gas (or gases) used in producing the gas jet 65 can be re-adsorbed into the glass when the molten glass G is later cooled down and returned to atmospheric pressure.

The gas jet 65 may be applied to the foam 45 in pulses to reduce the amount of gas required to produce the jet and to extend the area of penetration of the jet. That is, instead of continuously supplying the fuel and oxygen to the nozzle 63, the fuel and oxygen can be supplied to the nozzle 63 at predetermined intervals. These predetermined intervals may have varying lengths depending on the rate at which the foam is produced and the fragility of the foam at the area of penetration of the jet. Alternatively, multiple nozzles can be positioned across the width and down the length of the foam surface to distribute the breaking force. The multiple nozzles may produce pulsed jets. The pulses can be generated at different times in a pattern that will break the foam and prevent the foam from circumventing a single jet area. The nozzles may also be rotated and moved across the foam. Alternatively, the foam breakers 54 may be gas sprays in which particles of materials such as molybdenum, silica, or cullet particles are dispersed. The more massive liquid/solid particles in the gas sprays would impart a higher impact force to break the foams than the particle-free gas jets. The materials dispersed in the gas sprays are selected to be readily incorporated in the glass without producing bubbles or other defects.

Figure 7:
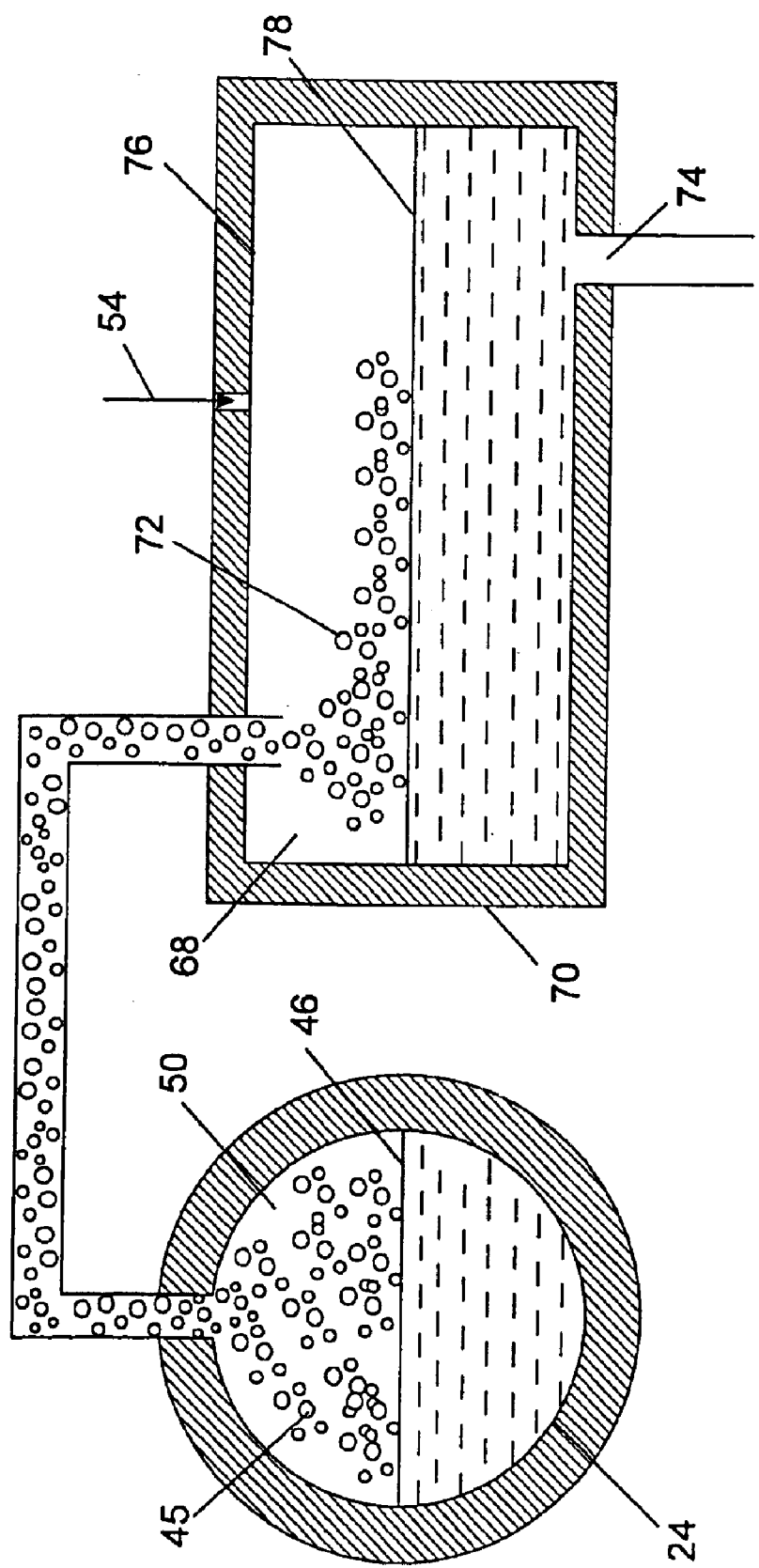
FIGS. 7 and 8 show different embodiments of foam chambers.

FIG. 7 illustrates another method for controlling the volume of foam 45 in the headspace 50. The method includes allowing the foam 45 in the headspace 50 to flow into a separate foam chamber 68, which is disposed within a vacuum housing 70 and maintained at the same pressure as the finer chamber 24. The glass between the bubbles of the foam 72 in the foam chamber 68 drains through an outlet port 74 in the foam chamber 68. A foam breaking device may be employed at the outlet end 76 of the foam chamber 68 to break the foam 72 after the foam has adequately "aged" or drained. Any of the previously discussed foam breakers 54 (shown in FIGS. 5A, 5B, and 6) may be used. It should be noted that the glass surface 78 in the foam chamber 52 will be about the same as the glass surface 46 in the finer chamber 24. The glass draining through the outlet port 74 can be directed back into the riser tube 28, or may be directed into a storage vessel (not shown) and later recycled through the glass melting furnace (not shown) as cullet. To avoid large capital expenditures, the foam chamber 68 may be made out of a temperature-resistant refractory such as alumina instead of a precious metal such as platinum.

Figure 8:
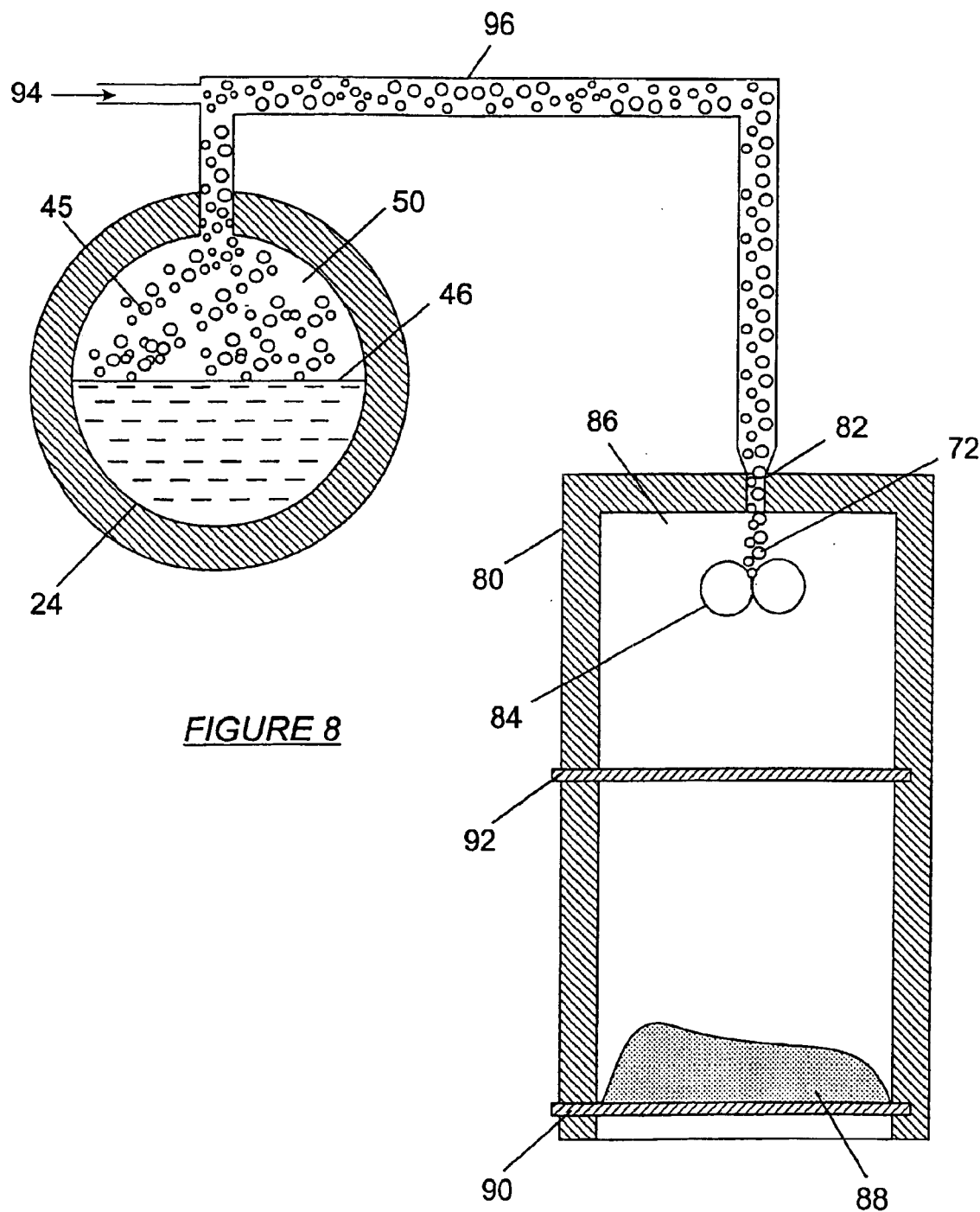

Instead of allowing the glass between the bubbles of the foam 72 to drain through the outlet port 74, the glass can be cooled and crushed. The crushed glass can be recycled through the glass melting furnace (not shown) or used in any application that calls for cullet. FIG. 8 shows a foam chamber 80 that can be used to cool and crush glass. The foam chamber 80 has an inlet port 82 for receiving foam from the finer chamber 24. A set of chilled rollers 84 is mounted at the upper section 86 of the foam chamber 80. The chilled rollers 84 are provided to cool and crush the foam 72 received at the inlet port 82. The fine grained cullet 88, i.e., crushed glass, produced by the chilled rollers 84 settles to the bottom of the foam chamber 80. The cullet 88 may be periodically collected by opening a gate 90 at the bottom of the foam chamber 80. Before opening the gate 90, another gate 92 above the gate 90 is closed to keep the cullet that is being produced by the chilled rollers 84 from dropping to the bottom of the foam chamber 80. The gate 92 is again opened and the gate 90 is closed after collecting the cullet 88. A purge gas 94 may be blown into the conduit 96, which connects the finer chamber 24 to the foam chamber 80, to assist in moving the foam 72 into the foam chamber 80. An outlet port 98 is provided in the foam chamber 80 through which the purge gas 94 may exit the foam chamber 80.

Figure 9:
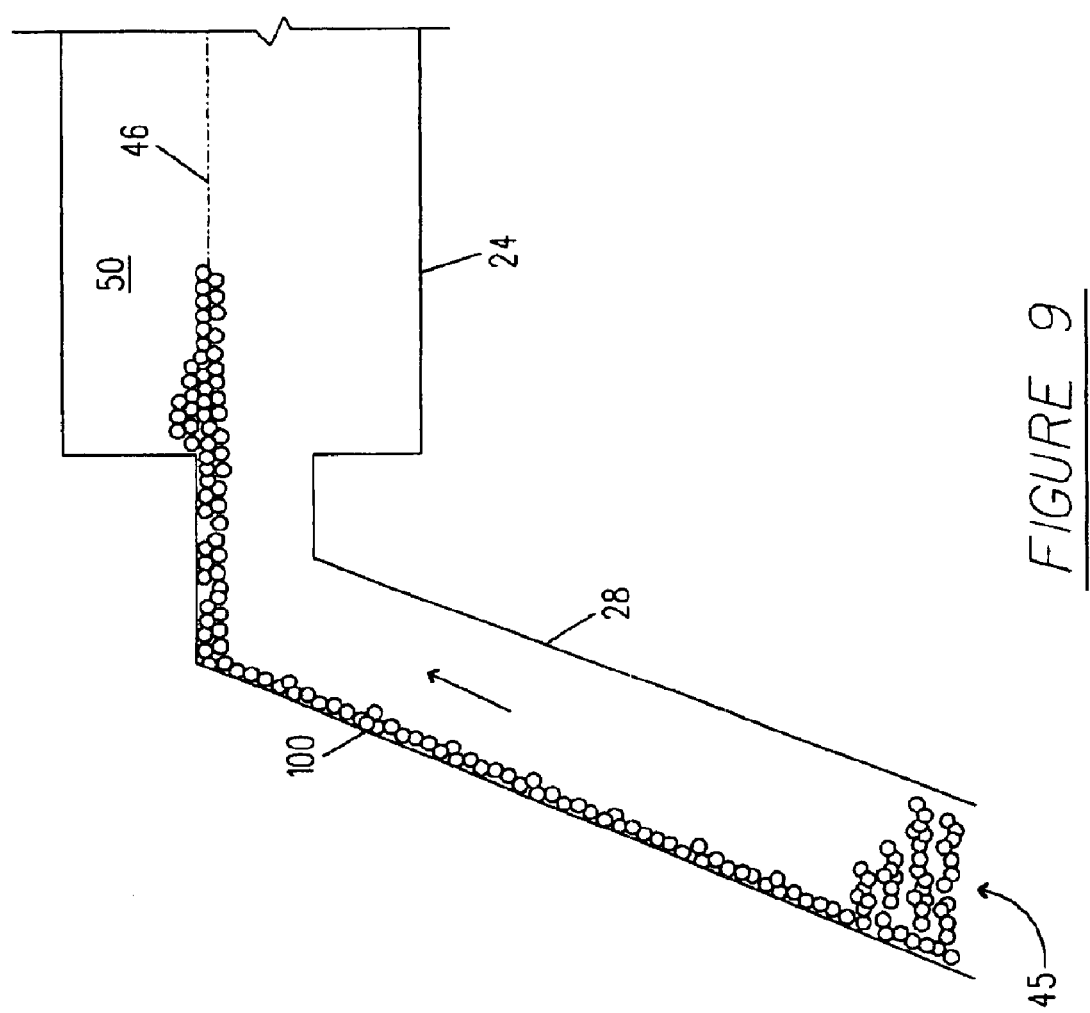
FIGS. 9 and 10 show reduced pressure finers with inclined risers.
Figure 10:
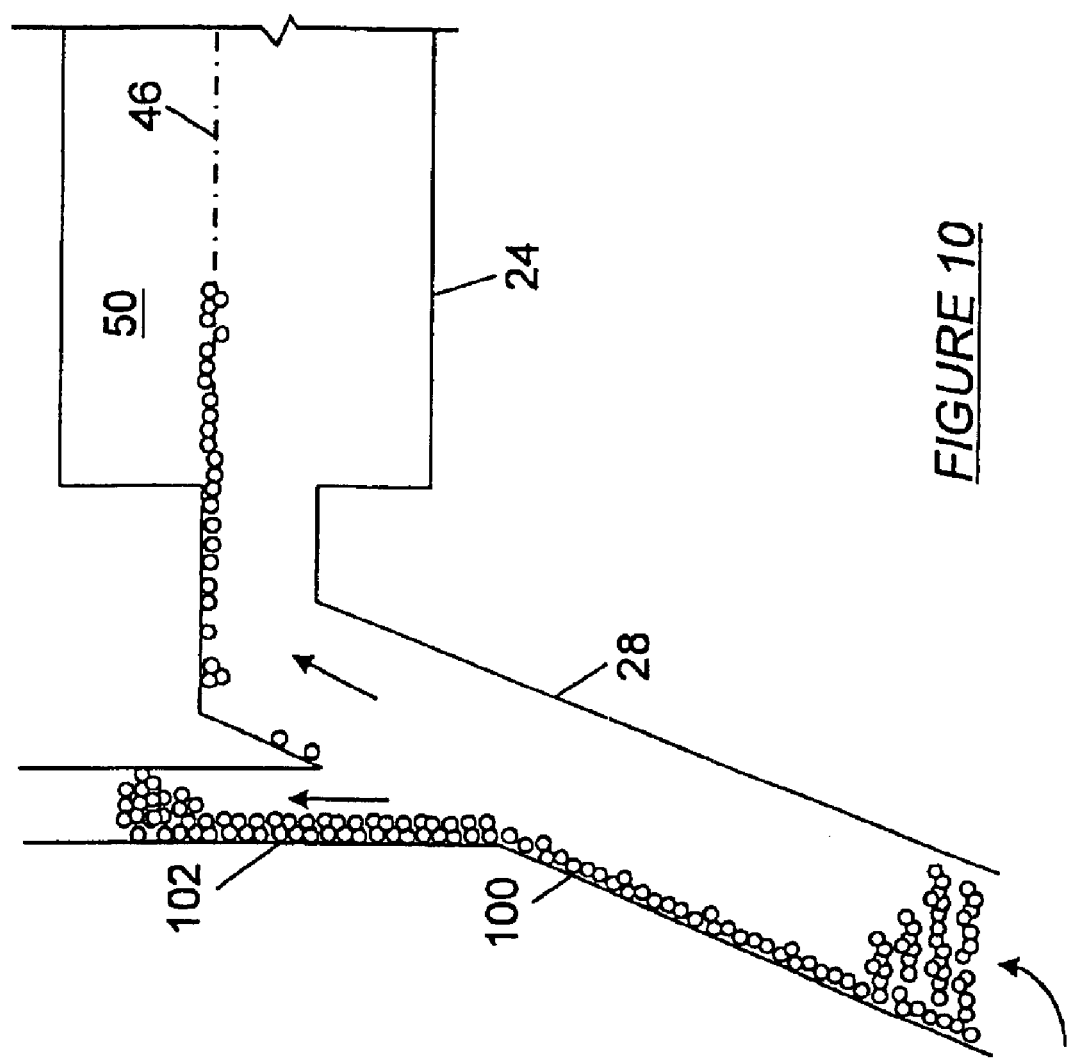

FIG. 9 illustrates another method for controlling the volume of foam 45 in the headspace 50. The method includes inclining the riser tube 28 with respect to the vertical so that a separation of bubbles from the molten glass occurs as the molten glass flows into the finer chamber 24. This allows the glass to be delivered to the finer chamber 24 relatively free of bubbles. In addition, the bubbles, because of their collection at the top 100 of the riser tube 28, have had an increased opportunity to coalesce. This increased bubble size aids the breaking of the foam 45 in the finer chamber 24. As shown in FIG. 10, a standpipe 102 can be added to the riser tube 28 to remove the bubbles at the top 100 of the riser tube 28 completely from the molten glass. The standpipe 102 is placed so that it rises above the glass line 46 in the finer chamber 24. The atmosphere over the standpipe 102 is at the same pressure as the finer chamber 24. Alternatively, the standpipe 102 could be placed at a lower elevation, that is, closer to the inlet end of the riser tube 28. In this case, the glass line in the standpipe 102 would be below the glass line 46 in the finer chamber 24. This would require that the atmosphere over the standpipe 102 be controlled at some higher pressure in order to maintain the glass level in the finer chamber 24. One advantage of using a standpipe is that the bubbles are removed from the molten glass at multiple points, accomplishing more separation. Another advantage is that the foam collected in the standpipe 102 can be subjected to more severe foam breaking measures than can be carried out in the finer chamber 24. The methods described above may be used to control the foam in the finer chamber 24.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for controlling the foam produced when a molten material encounters reduced pressure in a vacuum chamber, comprising:

passing the molten material through the vacuum chamber; and using a mechanical rotator to stretch, rupture and reduce foam on the molten material within the vacuum chamber, wherein said mechanical rotator is positioned within the vacuum chamber at a location where molten material has already started to drain from between bubbles in the foam on top of the molten material.

2. The method of claim 1, wherein said mechanical rotator includes a rotating cone at an end of a rod.

3. A method for controlling the foam produced when a molten material encounters reduced pressure in a vacuum chamber, comprising:

passing the molten material through the vacuum chamber; and using a nozzle that emits a gas jet including a first gas and a second gas, wherein the gas jet ruptures and reduces foam on the molten material within the vacuum chamber.

4. The method of claim 3, wherein said nozzle emits a gas jet which contains particulates that further help rupture and reduce foam on the molten material.

5. The method of claim 3, wherein said nozzle is a rotating nozzle.

6. The method of claim 3, wherein said nozzle emits a pulsed gas jet.

7. The method of claim 3, wherein said gas jet is adsorbed in the molten material.

8. The method of claim 3, wherein said nozzle is positioned within the vacuum chamber at a location where molten material has already started to drain from between bubbles in the foam on top of the molten material.

9. A method for controlling the foam produced when a molten material encounters reduced pressure in a vacuum chamber, comprising:

passing the molten material through the vacuum chamber; and using a nozzle that emits a gas jet which ruptures and reduces foam on the molten material within the vacuum chamber, wherein said nozzle is made from two concentric tubes where one tube emits oxygen and the other tube emits hydrogen to form the gas jet.

* * * * *